(No Model.)

R. HEIMBAUGH.
COFFEE OR TEA POT.

No. 418,461. Patented Dec. 31, 1889.

WITNESSES
F. L. Ourand
George A. Worster

INVENTOR
Reuben Heimbaugh,
by J. Sours Baggott
Attorneys

UNITED STATES PATENT OFFICE.

REUBEN HEIMBAUGH, OF SEDAN, KANSAS.

COFFEE OR TEA POT.

SPECIFICATION forming part of Letters Patent No. 418,461, dated December 31, 1889.

Application filed May 25, 1889. Serial No. 312,071. (No model.)

*To all whom it may concern:*

Be it known that I, REUBEN HEIMBAUGH, a citizen of the United States, and a resident of Sedan, in the county of Chautauqua and State of Kansas, have invented certain new and useful Improvements in Coffee or Tea Pots; and I do hereby declare that the following is a full, clear, and exact description of the invention, which will enable others skilled in the art to which it appertains to make and use the same.

My invention has relation to coffee-pots or tea-pots; and it consists in the construction and novel combination of parts, as hereinafter described and claimed.

Figure 1:
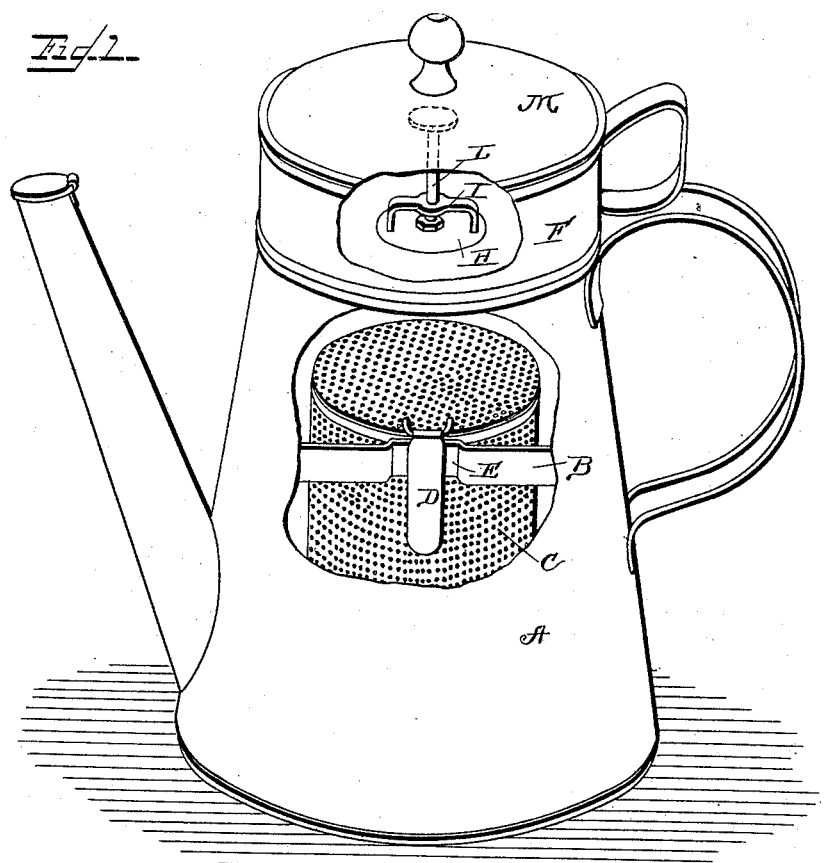
Figure 2:
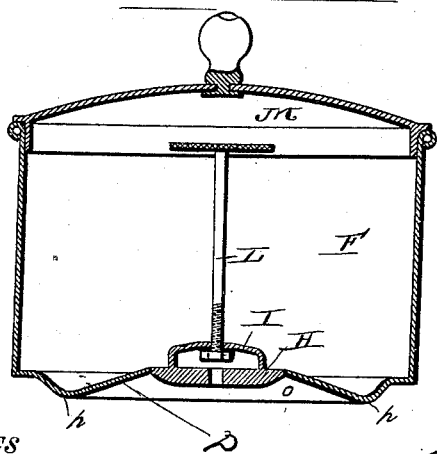

In the accompanying drawings, forming part of this specification, in which like letters of reference indicate corresponding parts, Figure 1 is a view partly in perspective and partly in vertical section of a coffee-pot or tea-pot embodying my improvements; and Fig. 2 is a vertical sectional view of the condenser removed, showing the valve unscrewed or open.

Referring by letter to the accompanying drawings, A designates a coffee-pot or tea-pot of the ordinary construction, except that the interior is provided at one side with a supporting-bar B, which is soldered at its ends to the body of the vessel. This bar B is designed to and does support the percolator C, which is cylindrical in form and is perforated in its body and heads to permit the liquid to escape into the interior of the coffee-pot or tea-pot, as the case may be. The percolator C is provided with a hinged cover, which is also perforated, and is provided, too, with a depending arm D, which is preferably a spring-arm, and is designed to be sprung upon the supporting-bar B to hold the percolator in the suspended position within the body of the vessel, so that it may discharge the liquid at all points through the perforations.

The cross-bar or supporting-bar B is provided with a rectangular bend E, to receive the spring-arm D when the percolator is in place.

It will be seen that by having the rectangular bend in the bar B the bar itself may be shorter and fastened closer to the side of the pot, thus being less in the way in washing. The arm D is also prevented from sliding along the bar by any movement of the pot, and thus the percolator is always held approximately in the center of the vessel.

By using the spring-arm D the percolator is more easily attached or removed, and is less liable to be broken; but the main advantage gained is that the motion of the water caused by heating and boiling causes a certain oscillation of the percolator, and the particles of water coming in contact with the coffee and tea grounds are constantly and quickly changing. Hence the strength of the herbs is extracted in a very few minutes. During this short period the water in the condenser F, which is removable and made to fit the mouth of the main vessel, becomes but partially warmed, and the steam bearing the aroma of the herbs in the percolator is condensed by coming in contact with the concaved bottom P. The condensing-surface of this bottom is increased by providing it with an annular corrugation, as shown at $p$, thus making the center concave, as at $o$. Thus it will be seen that all the strength and delicacy of flavor of the beverage is retained.

The removable condenser F is provided with a handle or hand-piece, and is also provided on the interior of its bottom with a thickened metallic center piece H, provided with a bridge I, through which the vertical valve-stem L works up and down, as may be necessary in manipulating the valve. The condenser is also provided with a removable cover M, and the spout is also provided with a hinged cap or cover to confine the aroma of the beverage.

In operation, scalding water is first poured upon the contents of the perforated cylinder, and the condenser is then placed in position upon the main vessel and the valve is closed. Cold water is then poured into the condenser, and when the coffee or tea has steeped or boiled the valve may be opened and the cold water allowed to pass through to the coffee or tea, for the purpose of settling or reducing the beverage.

I have found by actual practice that one-third of the amount of coffee or tea used in the ordinary manner is saved by the use of this device. It is obvious, however, that if occasion or necessity require this coffee-pot can be used in the ordinary manner without the use of the condenser.

Having thus fully described my invention, what I claim as new, and desire to secure by Letters Patent, is—

1. In a coffee or tea pot, the condenser having the concaved bottom and thickened center piece, the bridge formed on said center piece, and the valve-stem adjustable in said bridge, substantially as described.

2. In a coffee or tea pot, the combination, with the percolator having the depending spring-arm, of the bar having its ends secured to the body of the pot, and having an angular bend to receive the spring-arm, substantially as described.

In testimony that I claim the foregoing as my own I have hereunto affixed my signature in presence of two witnesses.

REUBEN HEIMBAUGH.

Witnesses:
A. WILSUN,
JOHN W. SHARTEL.